US010839541B2

(12) United States Patent
Tankovich et al.

(10) Patent No.: US 10,839,541 B2
(45) Date of Patent: Nov. 17, 2020

(54) HIERARCHICAL DISPARITY HYPOTHESIS GENERATION WITH SLANTED SUPPORT WINDOWS

(71) Applicant: Google LLC, Mountain View, CA (US)

(72) Inventors: Vladimir Tankovich, Renton, WA (US); Michael Schoenberg, Mountain View, CA (US); Sean Ryan Francesco Fanello, Mountain View, CA (US); Julien Valentin, Mountain View, CA (US)

(73) Assignee: Google LLC, Mountain View, CA (US)

( * ) Notice: Subject to any disclaimer, the term of this patent is extended or adjusted under 35 U.S.C. 154(b) by 113 days.

(21) Appl. No.: 16/158,676

(22) Filed: Oct. 12, 2018

(65) Prior Publication Data

US 2019/0287259 A1    Sep. 19, 2019

Related U.S. Application Data

(60) Provisional application No. 62/642,856, filed on Mar. 14, 2018.

(51) Int. Cl.
*G06T 7/593*    (2017.01)
*H04N 13/204*    (2018.01)
*G06K 9/62*    (2006.01)
*H04N 13/00*    (2018.01)

(52) U.S. Cl.
CPC ............ *G06T 7/593* (2017.01); *G06K 9/6202* (2013.01); *H04N 13/204* (2018.05); *G06T 2207/10012* (2013.01); *H04N 2013/0081* (2013.01)

(58) Field of Classification Search
CPC ..... G06T 7/593; G06K 9/6202; H04N 13/204
See application file for complete search history.

(56) References Cited

U.S. PATENT DOCUMENTS

2005/0286756 A1    12/2005    Hong et al.
2015/0178936 A1*   6/2015    Boisson ............... H04N 13/271
                                                                382/154

OTHER PUBLICATIONS

International Search Report and Written Opinion dated May 10, 2019 for corresponding International Application No. PCT/US2019/019177, 15 pages.
Dubbelman, G. et al. "Obstacle Detection During Day and Night Conditions Using Stereo Vision", 2007 IEEE/RSJ International Conference on Intelligent Robots and Systems; Oct. 29, 2007; pp. 109-116.

(Continued)

*Primary Examiner* — Leon Flores (57) ABSTRACT

A method includes capturing a first image and a second image of a scene using at least one imaging camera of an imaging system. The first image and the second image form a stereo image pair and each comprises a plurality of pixels. Each of the plurality of pixels in the second image is initialized with a disparity hypothesis. Matching costs of the disparity hypothesis for each of the plurality of pixels in the second image are recursively determined, from an image tile of a smaller pixel size to an image tile of a larger pixel size, to generate an initial tiled disparity map including a plurality of image tiles. After refining the disparity value estimate of each image tile and including a slant hypothesis, a final disparity estimate for each pixel of the image is generated.

20 Claims, 5 Drawing Sheets

(56) References Cited

OTHER PUBLICATIONS

Revaud, J. et al. "DeepMatching: Hierarchical Deformable Dense Matching", International Journal of Computer Vision; Dec. 1, 2016; 120(3); pp. 300-323.
Scharstein, D. et al., "A Taxonomy and Evaluation of Dense Two-Frame Stereo Correspondence Algorithms", International Journal of Computer Vision; Apr. 1, 2002; 47(1-3); pp. 7-42.
Tankovich et al, "SOS: Stereo Depth in O(1) with Slanted SupportWindows", IEEE International Conference on Intelligent Robots and Systems (IROS), Oct. 2018, 10 pages.

* cited by examiner

HIERARCHICAL DISPARITY HYPOTHESIS GENERATION WITH SLANTED SUPPORT WINDOWS

CROSS-REFERENCE TO RELATED APPLICATIONS

The present application claims priority to U.S. Provisional Patent Application No. 62/642,856, entitled "SLANTED O(1) STEREO" and filed on Mar. 14, 2018, the entirety of which is incorporated by reference herein.

BACKGROUND

In imaging systems, depth imaging may be obtained by correlating left and right stereoscopic images to match pixels between the stereoscopic images. The pixels may be matched by determining which pixels are the most similar between the left and right images. Pixels correlated between the left and right stereoscopic images may be used to determine depth information. For example, a disparity between the location of the pixel in the left image and the location of the corresponding pixel in the right image may be used to calculate the depth information using binocular disparity techniques. An image may be produced that contains depth information for a scene, such as information related to how deep or how far away objects in the scene are in relation to a camera's viewpoint. Such images are useful in perceptual computing for applications such as gesture tracking and object recognition, for example.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Various depth sensing technologies are used in computer vision tasks including telepresence, 3D scene reconstruction, object recognition, and robotics. These depth sensing technologies include gated or continuous wave time-of-flight (ToF), triangulation-based spatial, temporal structured light (SL), or active stereo systems. Such techniques have traditionally been computationally intensive or suffer from other draw backs (e.g., multipath for ToF systems). Since depth imaging may be used in a wide variety of applications, it may be desirable to make depth imaging more accurate and reliable. However, efficient estimation of depth from pairs of stereo images is computationally expensive and one of the core problems in computer vision. Multiple memory accesses are often required to retrieve stored image patches from memory. The algorithms are therefore both memory and computationally bound. The computational complexity therefore increases in proportion to the sample size, e.g., the number of pixels in an image.

The efficiency of stereo matching techniques can be improved using active stereo (i.e., stereo matching where scene texture is augmented by an active light projector), at least in part due to improved robustness when compared to time of flight or traditional structured light techniques. Further, relaxing the fronto-parallel assumption, which requires that the disparity be constant for a given image patch, allows for improved stereo reconstruction. Accordingly, FIGS. 1-6 describe systems and methods for dividing an image into multiple non-overlapping tiles. This disclosure provides techniques for exploring the much-larger cost volume corresponding to disparity-space planes by amortizing compute across these tiles, thereby removing dependency on any explicit window size to compute correlation between left and right image patches in determining stereo correspondence.

In some embodiments, a method of depth estimation from pairs of stereo images includes capturing, at a pair of cameras, a first image and a second image of a scene. The first image and the second image form a stereo pair and each include a plurality of pixels. Each of the plurality of pixels in the second image is initialized with a disparity hypothesis. The method includes recursively determining, from an image tile of a smaller pixel size to an image tile of a larger pixel size, matching costs of the disparity hypothesis for each of the plurality of pixels in the second image to generate an initial tiled disparity map including a plurality of image tiles, wherein each image tile of the initial tiled disparity map is assigned a disparity value estimate. The disparity value estimate of each image tile is refined to include a slant hypothesis. Additionally, the disparity value estimate and slant hypothesis for each tile may be replaced by a better matching disparity-slant estimate from a neighboring tile to incorporate smoothness costs that enforce continuous surfaces. A final disparity estimate for each pixel of the second image is determined based on the refined disparity value estimate of each image tile, which is subsequently used to generate a depth map based on the determined final disparity estimates.

Figure 1:
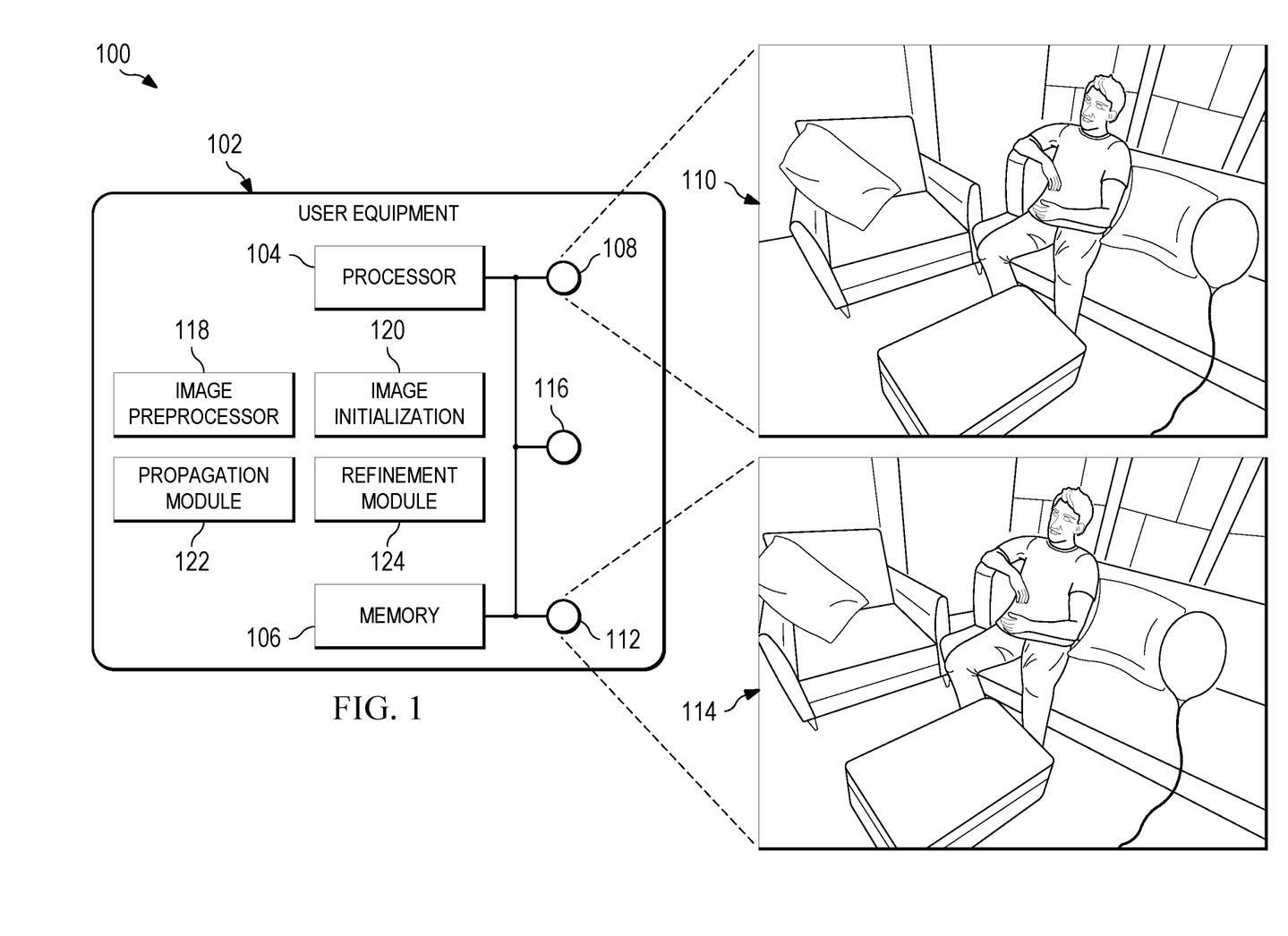
FIG. 1 is a block diagram of an active stereo imaging system configured to produce depth maps for AR/VR applications in accordance with at least one embodiment of the present disclosure.

FIG. 1 is a block diagram of an active stereo imaging system 100 configured to produce depth maps for AR/VR applications in accordance with at least one embodiment of the present disclosure. The active stereo imaging system 100 includes a user equipment 102 such as a tablet computer, computing-enabled cellular phone (e.g., a "smartphone"), a head-mounted display (HMD), a notebook computer, a personal digital assistant (PDA), a gaming system remote, a television remote, camera attachments with or without a screen, and the like. For ease of illustration, the active stereo imaging system 100 is generally described herein in the example context of a mobile device, such as a tablet computer or a smartphone; however, the active stereo imaging system 100 is not limited to these example implementations. For example, in other embodiments, the user equipment 102 can include another type of mobile device, such as an automobile, robot, remote-controlled drone or other airborne device, and the like. Some embodiments of the active stereo imaging system 100 include other devices that are configured to solve computer vision problems such as desktop computers, servers, and the like. Examples of computer vision problems that are addressed by the active stereo imaging system 100 include identification of stereo images, stereo matching, producing of depth maps, object classification, foreground/background segmentation, disparity estimation, image retrieval, feature approximation, background subtraction, body part classification, hand pose estimation, action recognition, 3D scanning, nonrigid reconstruction, 3D scene understanding, and the like.

The user equipment 102 includes a processor 104 and a memory 106. The processor 104 may be used to execute instructions stored in the memory 106 and to store information in the memory 106 such as the results of the executed instructions. The user equipment 102 also implements one or more cameras that are used to acquire images. In the embodiment of FIG. 1, the active stereo imaging system 100 includes a left infrared (IR) camera 108 for capturing at least a first left image 110. The active stereo imaging system 100 further includes a right infrared camera 112 for capturing at least a first right image 114. The processor 104 is configured to operate on pixels representative of the images 110, 114 and the memory 106 is configured to store values of the pixels of the image 110, 114. Although the cameras 108, 112 are integral to the user equipment 102 in this embodiment, in some embodiments of the user equipment 102 (or other processing devices) operate on images acquired by external image acquisition devices. Additionally, although described here in the context of infrared cameras, those skilled in the art will recognize that any type of imaging camera may be used without departing from the scope of this disclosure.

Due to the physical separation between cameras 108, 112, each pixel in one image (e.g., left image 110) has a correspondence match in the other image (e.g., right image 114) of its stereo pair which lies on the same vertical line (e.g., along y-axis), but at a different horizontal position (e.g., along x-axis). This difference in image location of the same three-dimensional (3D) point when projected under perspective to two different cameras is referred to as "disparity" and is used to extract depth information. However, finding correspondence between pixels can be difficult in texture-less regions of images (e.g., when looking at a white wall or a blue sky).

Thus, in various embodiments, the user equipment also includes an active light projector 116, such as a diffractive optical element (DOE) projector, that projects energy into a real-world environment surrounding the user equipment 102 to artificially produce texture in the scene. The active light projector 116 projects a pattern (e.g., a dot pattern, a striped pattern, or other pattern structure) into the surrounding environment to provide texture for the field of view of the cameras 108, 112 to be used for stereo matching. In some embodiments, the active light projector 116 operates in the infrared spectrum in conjunction with the cameras 108, 112. In other embodiments, the active light projector 116 operates in the visible spectrum. The active stereo vision configuration provided by the active light projector 116 and one or more cameras allow for disparity vector-based depth calculations to be performed for texture-less regions and removes the need to project a known structured light (SL) pattern.

Although the producing of depth maps for active stereo imaging system 100 is described here in the context of an active stereo vision configuration with an active light projector and two cameras, those skilled in the art will recognize that any type of projector capable of outputting a pattern into the scene and any number of sensors capable of receiving image data may be used without departing from the scope of this disclosure. For example, in some embodiments, depth estimation may also be performed in a structured light configuration with a single projector and a single camera. In another embodiment, depth estimation may also be performed in a passive configuration without an active light projector. In other embodiments, depth estimation may also be performed in a motion stereo configuration using a single camera and no active light projectors.

When evaluating disparity hypotheses, traditional stereo algorithms solve correspondence problems by centering an image patch on a pixel of a reference frame. The image patch is displayed in a second image to identify a matching point of that pixel in the second image. An implicit assumption of these traditional stereo algorithms is that all pixels within the image patch have constant disparity (i.e., referred to as the fronto-parallel assumption). In practice, the fronto-parallel assumption is unlikely to hold true for all pixels, as the image patch often includes pixels that lie on a different surface than the center pixel or the image patch captures a surface that is slanted relative to the camera axes (i.e., not fronto-parallel). Accordingly, to reduce computational overhead associated with estimation of disparity (and hence depth) and slant for finding correspondence across stereo images, the active stereo imaging system 100, in various embodiments, includes using local smoothness to amortize disparity compute across the entire stereo pipeline. The active stereo imaging system 100, in various embodiments, includes an image preprocessor module 118, an image initialization module 120, a propagation module 122, and a refinement module 124. Each of these modules represents hardware, software, or a combination thereof, configured to execute the operations as described herein.

The image preprocessor module 118 processes the raw IR signal for the left image 110 and the right image 114 with local contrast normalization (LCN) such that simpler matching costs can be used for determining stereo correspondence. The image initialization module 120 performs a hierarchical search in which each pixel of an image is seeded with a number of disparity hypotheses, which the image initialization module 120 then recursively examines in a fine-to-coarse manner by dividing the images into multiple non-overlapping tiles of increasing pixel size, as described in further detail below. The hierarchical search performed by the image initialization module 120 generates a tiled disparity map in which each tile is assigned a single disparity value as an initial estimate. Subsequently, the propagation module 122 propagates disparity hypotheses at the tile level by refining the initial estimates to jointly optimize for surface angle, surface smoothness constraints, and matching cost. The propagation module 122 outputs a per tile hypothesis, including both an estimate of the disparity and slant for each tile, that describes the local tile surface. After propagation, the refinement module 124 performs refinement of the tile hypotheses to infer per-pixel disparity by using adjusted per-tile hypothesis and local matching costs to write out per pixel disparity before performing final invalidation of clearly erroneous values and smoothing.

Figure 2:
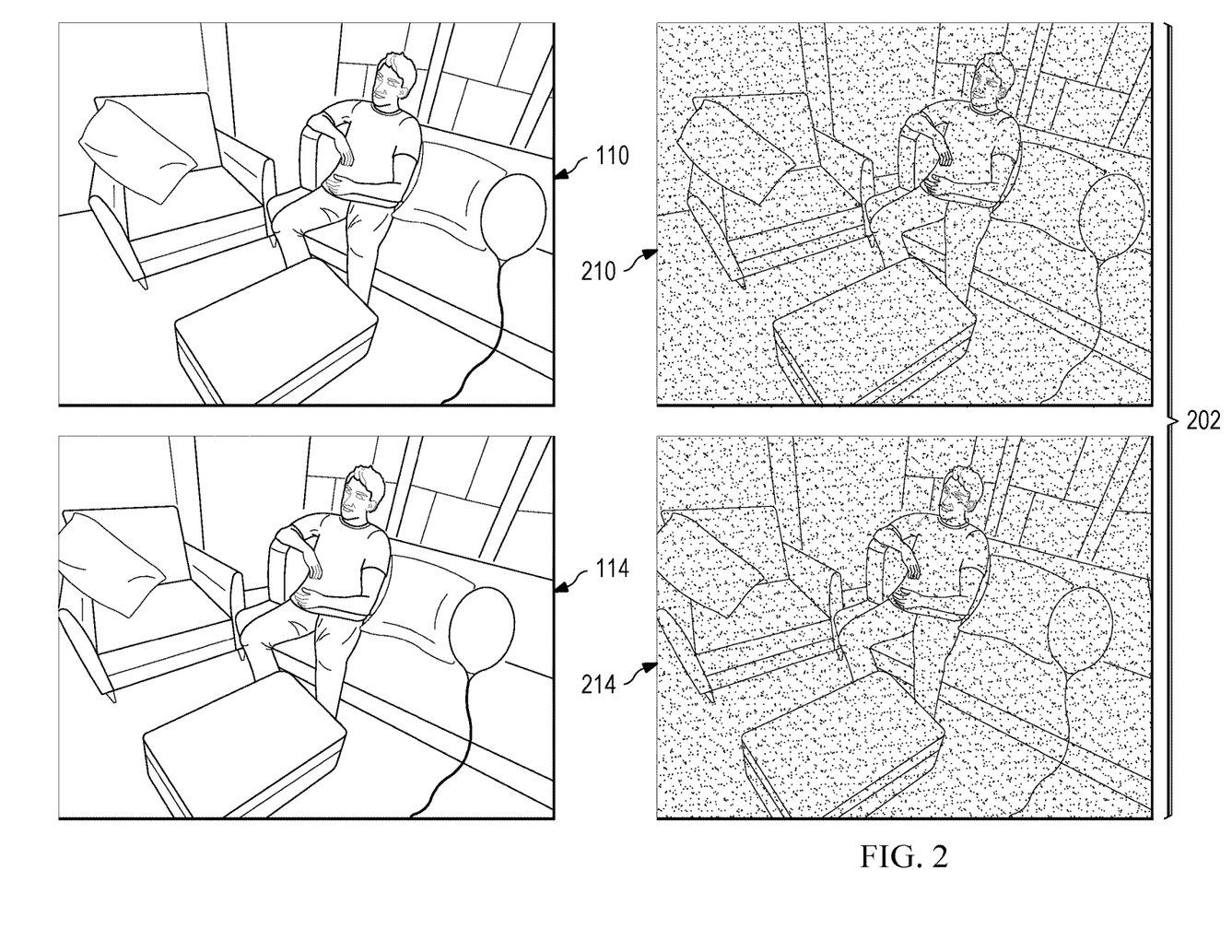
FIG. 2 is a diagram illustrating the operations of an image preprocessor in accordance with at least one embodiment of the present disclosure.

FIG. 2 is a diagram illustrating the operations of an image preprocessor, such as image preprocessor module 118 of FIG. 1, to preprocess images in accordance with at least one embodiment of the present disclosure. The image preprocessor module 118 receives a rectified stereo pair of images (e.g., the left image 110, which is also interchangeably referred to as $I_L$ in this disclosure and the right image 114, which is also interchangeably referred to as $I_R$ in this disclosure) as input. Given the pair of stereo images 110, 114, rectification determines a transformation of each image plane such that pairs of conjugate epipolar lines become collinear and parallel to one of the image axes. Accordingly, for each pixel p=(x, y) in one image (e.g., the left image 110) has a correspondence match to its corresponding pixel p' in the other image of its stereo pair (e.g., right image 114) which lies on the same y-axis but at a different x-axis coordinate. The image preprocessor module 118 preprocesses the left image 110 and the right image 114 with local contrast normalization (LCN) to generate a left LCN image 210 and a right LCN image 214 (referred to herein as a left-right LCN pair 202 of images). The LCN normalizes the left image 110 and the right image 114 such that simpler matching costs can be used for stereo correspondence.

Figure 3A:
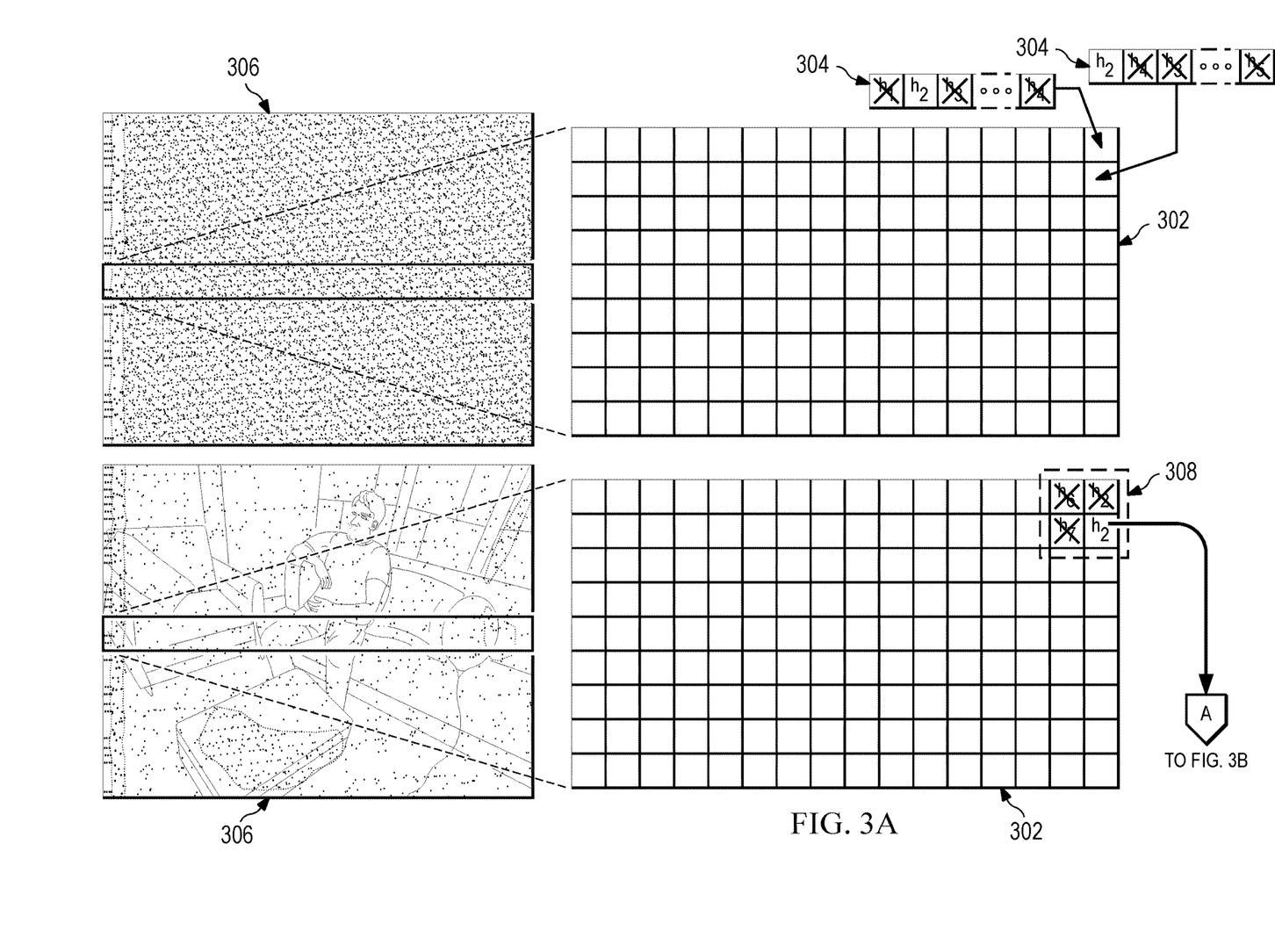
FIGS. 3A-3B are diagrams illustrating the operations of an image initializer to perform hierarchical initialization in accordance with at least one embodiment of the present disclosure.
Figure 3B:
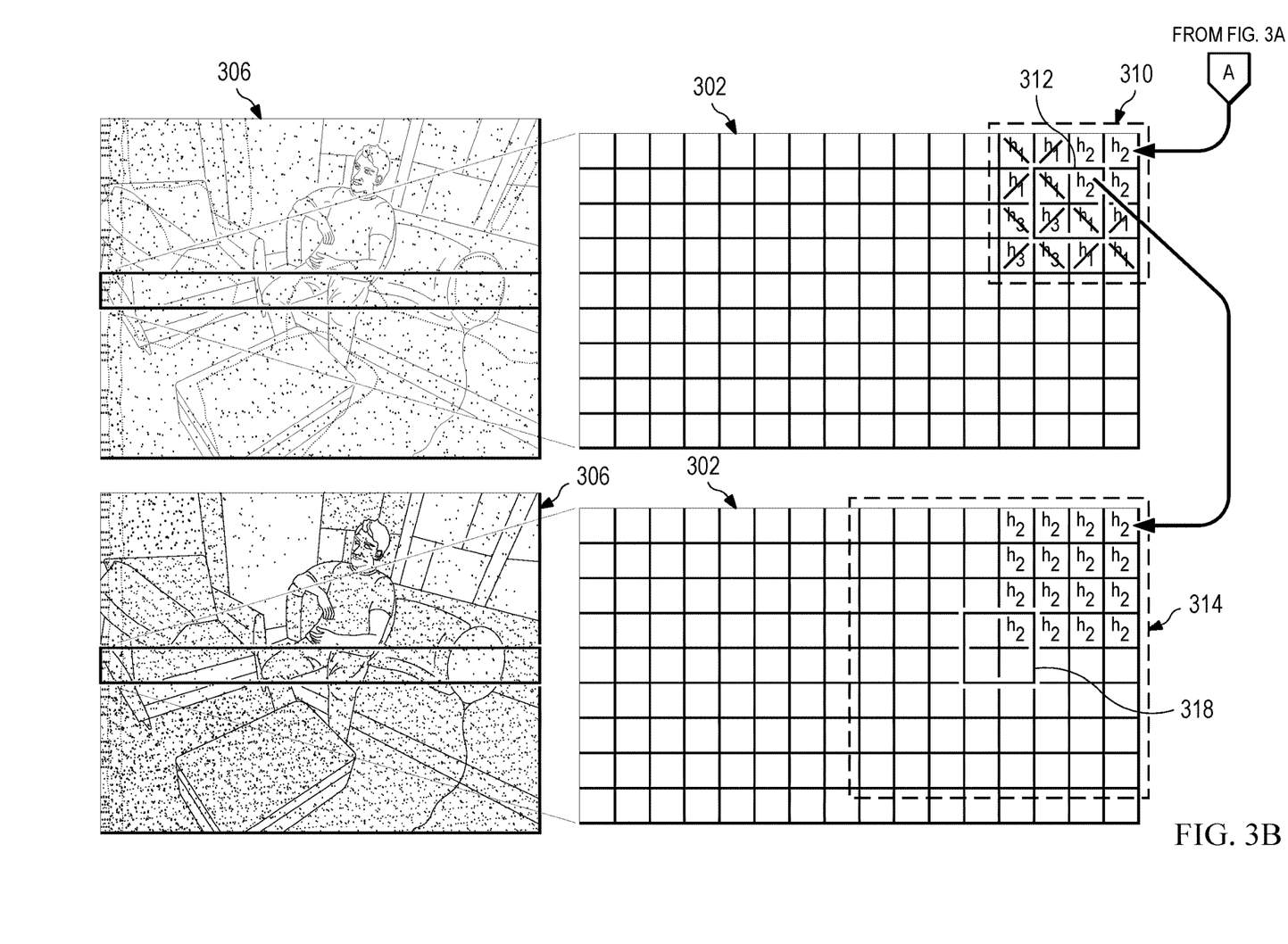

FIGS. 3A-3B are diagrams illustrating the operations of an image initializer, such as image initialization module 120 of FIG. 1, to perform hierarchical initialization in accordance with at least one embodiment of the present disclosure. The image initializer receives a pair of calibrated and rectified images (e.g., left-right LCN pair 202 of FIG. 2) as input and performs a hierarchical search to output an initial tiled disparity map, where the disparity values within each tile follows a planar equation. The image initializer computes, for every pixel 302, matching costs associated with a set of disparity hypotheses 304. In some embodiments, the set of disparity hypotheses 304 includes a number K of random or predefined integer disparity hypotheses (i.e., integer disparity values).

Each pixel p=(x, y) 302 in one image (e.g., the left image 110) has a correspondence match to its corresponding pixel p' in the other image of its stereo pair (e.g., right image 114) which lies on the same y-axis but at a different x-axis coordinate, $\hat{x}$. The difference $d=x-\hat{x}$ represents disparity and is inversely proportional to its depth $$Z = \frac{bf}{d},$$

where b is the baseline of the stereo system and f is the focal length. That is, due to the input images being rectified images, for each pixel p=(x, y) in one image (e.g., the left image 110), there is a corresponding pixel p'=(x−d, y) in the other image of its stereo pair (e.g., right image 114).

At a per-pixel level, the image initializer uses a matching cost calculation to identify a single disparity hypothesis of the set of disparity hypotheses 304 with the best cost. For example, in some embodiments, a pixel-wise sum of absolute differences (SAD) calculation identifies a single disparity hypothesis of the set of disparity hypotheses 304 with the best cost. The SAD calculation includes comparing the absolute differences between hypotheses in the set of disparity hypotheses 304 for a pixel relative to the disparity between its corresponding pixels in the stereo image pair. A single disparity hypothesis with the best cost (i.e., lowest matching cost) for each pixel 302 is stored, as illustrated in FIG. 3A, to generate a tiled disparity map 306 in which the tiles are 1×1 pixels wide. In other embodiments, various other matching cost calculations (e.g., sum of squared difference, zero-mean normalized cross-correlation (ZNCC), and the like) are implemented to identify a single disparity hypothesis of the set of disparity hypotheses 304 with the best cost.

In a fine-to-coarse ranking and aggregation manner, the image initializer then increases the tiles to a size of 2×2 pixels wide and recursively examines 2×2 non-overlapping tiles containing winning hypotheses from the previous level. The image initializer computes, for each 2×2 non-overlapping tile 308, matching costs associated with the four winning disparity hypotheses associated with that tile 308 from the previous level of recursion. The value of pixels 302 in the disparity map 306 is updated by storing a single disparity hypothesis with the best cost for each pixel of the tile 308. That is, the pixels 302 of each 2×2 non-overlapping tile 308 (only one tile highlighted by dotted line in FIG. 3A for ease of illustration) stores the value of a winning hypothesis from the previous level of recursion, which the image initializer evaluates across the entire 2×2 non-overlapping tile 308 (e.g., using SAD) in pixel space. The hypothesis candidates are ranked, and the winning hypothesis per tile 308 is provided as input to the next level (e.g., coarser granularity) of the recursion.

As shown, in the next level of the recursion, the image initializer increases the tiles to a size of 4×4 pixels wide and recursively examines 4×4 non-overlapping tiles containing winning hypotheses from the previous level. The image initializer computes, for each 4×4 non-overlapping tile 310, matching costs associated with four winning disparity hypotheses of the four 2×2 tiles 308 from the previous level of recursion (e.g., as represented by the set of four values 312 at the center of tile 310). The value of pixels 302 in the disparity map 306 is updated by storing a single disparity hypothesis with the best cost for each pixel of the tile 310. That is, the pixels 302 of each 4×4 non-overlapping tile 310 (only one tile highlighted by dotted line in FIG. 3B for ease of illustration) stores the value of a winning hypothesis from the previous level of recursion, which the image initializer evaluates across the entire 4×4 non-overlapping tile 310 (e.g., using SAD) in pixel space. The hypothesis candidates are ranked, and the winning hypothesis per tile 310 is provided as input to the next level (e.g., coarser granularity) of the recursion.

Each level of the recursion doubles the width and height of the tiles but halves the number of tiles in each dimension that must be processed. As illustrated in the example of FIG. 3B, the image initializer performs another round of matching cost comparison using 8×8 non-overlapping tiles 314 to generate an initial tiled disparity map 316 with a hypothesis for each 8×8 non-overlapping tile 314. That is, the image initializer computes, for each 8×8 non-overlapping tile 314, matching costs associated with four winning disparity hypotheses of the four 4×4 tiles 310 from the previous level of recursion (e.g., as represented by the set of four values 318 at the center of tile 314), ranks those hypothesis candidates (i.e., set of four values 318), and propagates the winning hypothesis with the lowest matching cost to the rest of the tile 314.

Although initialization is described here in the context of performing a hierarchical search that recursively generates the initial tiled disparity map 316 having a tile size of 8×8 pixels, those skilled in the art will recognize that any number of levels of recursion may be performed without departing from the scope of this disclosure. For example, in another embodiment, a further level of recursion is performed to generate an initial tiled disparity map having a tile size of 16×16 pixels. Additionally, those skilled in the art will recognize that although described here in the context of increasing the width and height of the tiles by a factor of two for each level of the recursion, other embodiments include changing tile dimensions by a different factor (e.g., 1×1 tiles at a first level of recursion, 3×3 tiles at a second level of recursion, 9×9 tiles at a third level of recursion, and the like). In other embodiments, the tile dimensions change by a different factor for each level of recursion (e.g., 1×1 tiles at a first level of recursion, 2×2 tiles at a second level of recursion, 6×6 tiles at a third level of recursion, 12×12 at a fourth level of recursion, and the like).

In this manner, reconstruction error for a correct disparity is low for all time sizes—true negative (e.g., poor reconstruction error and incorrect disparity) candidates are quickly rejected at low cost, and the image initializer samples much of the disparity space in this manner at the finer levels of the recursion. False positive (e.g., good reconstruction error but poor disparity) and true positive (e.g., good reconstruction error and correct disparity) candidates are propagated up the hierarchy where increasingly larger tiles permit removal of false positives while retaining true positives. The initialization described herein outputs an initial disparity map with a single disparity hypothesis for each tile (e.g., each 8×8 tile 314 as illustrated in FIG. 3B). The disparity hypothesis is assumed to be fronto-parallel such that physical points in the 3D world corresponding to the tiles have a similar appearance when viewed from different vantage points and that the depth within each tile is homogenous. However, this fronto-parallel assumption is often violated, as a 3D scene seldomly consists only of upright planar surfaces. Accordingly, as described further below, the initial tiled disparity map is refined to relax the fronto-parallel constraint.

Figure 4:
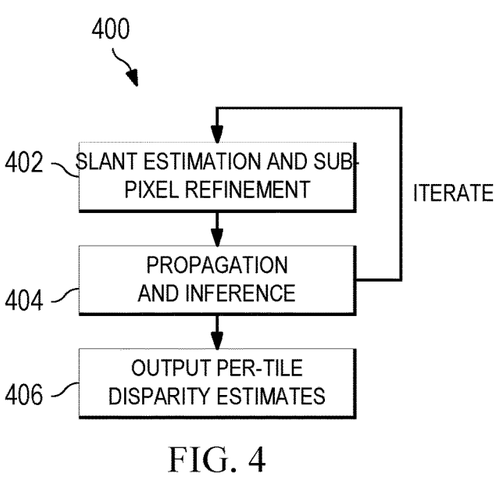
FIG. 4 is a flow diagram illustrating a method of propagating hypotheses at the tile level in accordance with at least one embodiment of the present disclosure.

FIG. 4 is a flow diagram illustrating a method 400 of propagating, such as by using propagation module 122 of FIG. 1, hypotheses at the tile level in accordance with at least one embodiment of the present disclosure. As discussed above, the image initializer outputs an initial disparity map in which each tile (e.g., 8×8 tile 314 of FIG. 3B) is assigned a single disparity value d. However, the initial tiled disparity map includes an incorrect local minimum from the matching cost determination to find a minimum cost surface for some of the tiles. Additionally, the output of the initial disparity map from the image initializer includes fronto-parallel depth tiles for the full image. However, such fronto-parallel constraints need to be relaxed to allow for slanted surfaces in a scene.

At block 402, the method 400 begins with a slant estimation and sub-pixel refinement process in which the propagation module 122 refines the disparity d for each tile via a standard parabola fit in the cost space. The propagation module 122 evaluates the matching cost (e.g., using SAD and the like) of a full tile (e.g., 8×8 tile 314 of FIG. 3B) with disparity d−1, disparity d, and disparity d+1. In other embodiments, the propagation module 122 evaluates the matching cost (e.g., using SAD and the like) of a full tile (e.g., 8×8 tile 314 of FIG. 3B) with disparity d−a parameter (e.g., value other than 1), disparity d, and disparity d+a parameter (e.g., value other than 1). The propagation module 122 fits a parabola to the local cost space described by those reconstruction errors. Using the standard closed form expression, the propagation module 122 extracts the minimum of this quadratic polynomial and designates the minimum as a refined estimate of disparity d. However, the refined estimate still corresponds to a fronto-parallel planar solution. In the vast majority of scenes, this fronto-parallel assumption does not hold and hence must be lifted.

Thus, the propagation module 122 increases the degree of the model by one, such that geometric structures in disparity space are represented by planes in disparity space, rather than by constant integer values. Since depth and disparity are inversely proportional to each other, a plane equation in disparity space corresponds to a smooth quadratic surface in depth. When considering fronto-parallel depth, the following equation defines how pixels in the left image $x_L$ are related to pixels in the right image $x_R$:

$$x_L = x_R - d \quad (1)$$

By describing a plane $l=[d,d_x,d_y]$ in disparity space, the relationship of equation (1) becomes:

$$x_L = x_R + S(x_L, l)$$

$$S(x_L, l) = k_x d_x + k_y d_y - d \quad (2)$$

where $k_x$, $k_y$ are any offset from the patch center and $d_x, d_y$ are the coefficients controlling the orientation of the plane. Similar to the refinement of d, the propagation module 122 optimizes the values of $d_x$ and $d_y$ by fitting a parabola to costs computed by evaluating three different plane hypotheses on the tile (e.g., fronto-parallel, +30 degrees slant, and −30 degrees slant). The minimum of the quadratic function is close to the true minimum for a majority of tiles. Once this refinement is complete, each tile of the tiled disparity map is associated with a disparity model that follows a plane equation.

However, the initial tiled disparity map often includes an incorrect local minimum from the matching cost determination to find a minimum cost surface for some of the tiles. At block 404, the method 400 continues with a propagation process in which the propagation module 122 refines the disparity d for each tile via a standard parabola fit in the cost space. The propagation module 122 performs patch level propagation and enforces local disparity consistency and smoothness, and models local surface slant and curvature. Further, the propagation module 122 performs sub-pixel refinement by using nearby patch hypotheses about surface and local matching costs, allowing the adding of depth details smaller than patch size (while still limited by feature size present in the image).

In various embodiments, the propagation module 122 defines a data term $\psi(l_i)$ corresponding to the reconstruction error for a tile i under the planar hypothesis $l_i$, as represented by the following equation:

$$\psi_u(l_i) = \sum_{p \in \mathcal{T}_i} |I_L(p) - I_R(p_x - S(p_x, l_i)(p_y)| \quad (3)$$

where the summation is performed for all pixels p from the set of pixels $\mathcal{T}_i$ contained in tile i. The function $S(p_x, l_i)$ of equation (2) estimates the disparity of pixel p under the planar hypothesis $l_i$. $I_L(.)$ and $I_R(.)$ return the intensity values stored in the left and right images, respectively, for queried pixels. The proposed unary (i.e., taking solution smoothness into account) potential evaluates the reconstruction error (e.g., SAD and the like) under the planar hypothesis $l_i$. This is different from the reconstruction error evaluated previously, where the error is evaluated exclusively using fronto-parallel planes.

Instead, the propagation module 122 evaluates a pairwise potential $\psi_p$ over the neighbors $\mathcal{N}_i$, corresponding to the tiles above, below, left, and right from tile i, and is defined as $$\psi_p(l_i, l_j) = \lambda \max(|l_i^d - S(c(i)_x, l_j)|, 3) \quad (4)$$

where c(i) returns the position of the pixel at the center of tile i, and $l_i^d$ corresponds to the disparity component of the planar hypothesis $l_i$. The function of equation (4) first evaluates what the disparity of the center of tile i would be if it were to belong to the plane $l_j$. A truncated $l_1$-norm between that estimated disparity and the current candidate disparity is then computed. In order to not over-penalize large disparity changes (e.g., transitions from foreground to background), this distance is truncated. The parameter λ controls the degree of smoothness in the solution.

The union of the labels associated with the current tile and its $|N_i|$ neighbors is ranked by evaluating the following minimizer equation:

$$E(Y_i|D)=\psi_u(l_i)+\sum_{j\in N_i}\psi_p(l_i,l_j) \quad (5)$$

which is used as the new disparity value for tile i, representing a hypothesis matching cost per tile that describes the local surface.

As shown in FIG. 4, the propagation operations of blocks 402 and 404 are iterated a number of times to model slanted surfaces, enforce local smoothness, and fill in gaps left by initialization. Thus, during the propagation operations of method 400, disparity and slant estimates for each tile may be replaced by a better matching disparity-slant estimate from a neighboring tile to incorporate smoothness costs that enforce continuous surfaces. Generally, performing two iterations of the above-described propagation operations is sufficient to converge to good solutions. At block 406, a per tile hypothesis that describes local smoothness is outputted. Once propagation is completed, the disparity at each tile is refined using another parabola fit leveraging the estimated as described in further detail below.

Figure 5:
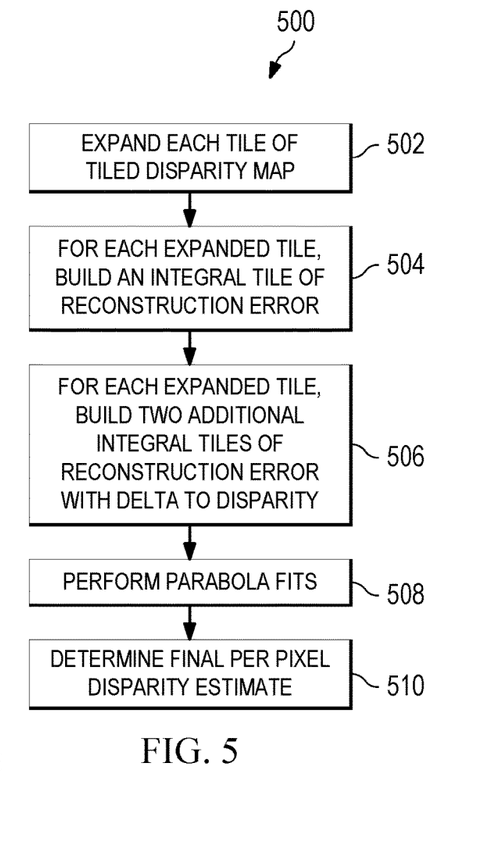
FIG. 5 is a flow diagram illustrating a method of refining per-tile estimates to infer per-pixel disparity in accordance with at least one embodiment of the present disclosure.

FIG. 5 is a flow diagram illustrating a method 500 of refining, such as by using refinement module 124 of FIG. 1, per-tile estimates to infer per-pixel disparity in accordance with at least one embodiment of the present disclosure. After propagation is complete, each tile of the tiled disparity map includes an estimate of the disparity and slant. The slant quadratic approximation of the above propagation processes for estimating the slant of tiles is robust in the 30 degrees to −30 degrees range. Although this range of angles provides inferred solutions that are higher quality relative to assuming fronto-parallel tiles, real surfaces can be much steeper and quadratic approximation becomes weaker for angles greater than 30 degrees. Accordingly, the refinement module computes the final slant of each tile using central differences built using the disparity at the center of neighboring tiles.

To obtain precise per-pixel results, the method 500 begins at block 502 by expanding each tile of the tiled disparity map by 50% in both the x- and y-axis directions, causing any given pixel (except at the image boundaries) to overlap 4 expanded tiles. In other embodiments, rather than expanding each tile of the tiled disparity map in both the x- and y-axis directions, a tile of the tiled disparity map is expanded in one or more directions if the tile hypothesis in that direction is above a difference threshold (e.g., based on a pre-determined level of difference) relative to a current tile hypothesis of the tile (i.e., the tile to be expanded). This approach saves compute at a cost of blurring small details.

At block 504, the refinement module 124 builds, for each expanded tile, an integral tile of the reconstruction error (e.g., SAD and the like) obtained using the corresponding plane hypothesis $l_i$. Additionally, at block 506, the refinement module 124 builds two additional integral tiles per expanded tile, which captures the reconstruction error with a small delta added to the disparity component of $l_i$. At block 508, the refinement module 124 performs four parabola fits, for each pixel of the expanded tiles, of their respective cost volumes using the above integral tiles. After the parabola fit, each expanded tile includes a disparity and cost per pixel. Thus, each pixel in the original image (e.g., the left image 110 or the right image 114) is covered by up to four expanded tiles. At block 510, the refinement module 124 determines final per pixel disparity and cost values by identifying the final value for each pixel as the best out of the values as computed in the expanded tiles (from the up to four expanded tiles). The cost of each pixel is defined as the reconstruction error and is computed over patches centered on the pixel in question, with the smallest interpolated reconstruction error saved as the final disparity estimate.

Figure 6:
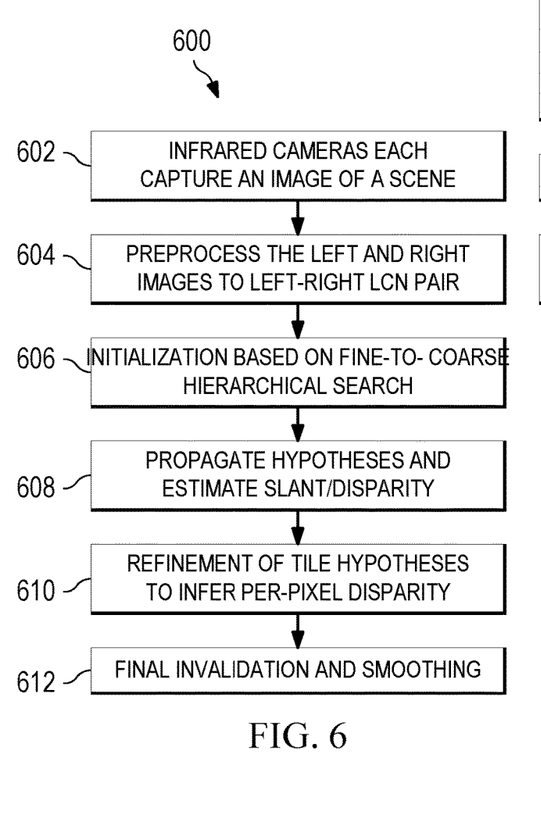
FIG. 6 is a flow diagram illustrating a method of estimating depth from pairs of stereo images in accordance with at least one embodiment of the present disclosure.

FIG. 6 is a flow diagram illustrating a method 600 of estimating depth from pairs of stereo images in accordance with at least one embodiment of the present disclosure. At block 602, the IR cameras 108, 112 of FIG. 1 each capture an image of a scene, forming a pair of stereo images. As illustrated in FIG. 1, the left IR camera 108 captures a left image 110 and the right IR camera 112 captures a right image 114. In this embodiment, the left image 110 is the reference image from which disparity is determined. In other embodiments, the right image 114 is the reference image.

At block 604, the image preprocessor module 118 processes the raw IR signal for the left image 110 and the right image 114 of block 602 with local contrast normalization (LCN) such that simpler matching costs can be used for determining stereo correspondence. At block 606, the image initialization module 120 performs a hierarchical search in which each pixel of an image is seeded with a number of disparity hypotheses, which the image initialization module 120 then recursively examines in a fine-to-coarse manner by dividing the images into multiple non-overlapping tiles of increasing pixel size, as described in further detail above relative to FIGS. 3A-3B.

In various embodiments, in a fine-to-coarse ranking and aggregation manner, the image initialization module 120 recursively examines non-overlapping tiles containing winning hypotheses from the previous level. The image initialization module 120 computes, for a tile (e.g., 2×2 non-overlapping tile 308 of FIG. 3A), matching costs associated with the four winning disparity hypotheses associated with that tile 308 from the previous level of recursion. The value of pixels 302 in the disparity map 306 is updated by storing a single disparity hypothesis with the best cost for each pixel of the tile 308. That is, the pixels of each 2×2 non-overlapping tile 308 stores the value of a winning hypothesis from the previous level of recursion, which the image initialization module 120 evaluates across the entire 2×2 non-overlapping tile 308 (e.g., using SAD and the like) in pixel space. The hypothesis candidates are ranked, and the winning hypothesis per tile 308 is provided as input to the next level (e.g., coarser granularity with larger tiles, e.g., 2×2 non-overlapping tile 310) of the recursion. The hierarchical search performed by the image initialization module 120 generates a tiled disparity map in which each tile is assigned a single disparity value as an initial estimate.

At block 608, the propagation module 122 propagates disparity hypotheses at the tile level by refining the initial estimates to jointly optimize for surface angle, surface smoothness constraints and matching cost, as described in further detail above relative to FIG. 4. The propagation module 122 outputs a per tile hypothesis, including both an estimate of the disparity and slant for each tile, that describes the local tile surface.

After propagation, at block 610, the refinement module 124 performs refinement of the tile hypotheses to infer per-pixel disparity by using adjusted per-tile hypothesis and local matching costs to write out per pixel disparity as described in further detail above relative to FIG. 5. In some embodiments, the refinement module 124 expands each tile of the tiled disparity map in one or more of the x- and y-axis directions, causing any given pixel (except at the image boundaries) to overlap up to four expanded tiles. The refinement module 124 builds, for each expanded tile, an integral tile of the reconstruction error (e.g., SAD and the like) obtained using the corresponding plane hypothesis L. Additionally, the refinement module 124 builds two additional integral tiles per expanded tile, which captures the reconstruction error with a small delta added to the disparity component of h. The refinement module 124 performs four parabola fits, for each pixel of the expanded tiles, of their respective cost volumes using the above integral tiles. The cost of each pixel is defined as the reconstruction error and is computed over patches centered on the pixel in question, with the smallest interpolated reconstruction error saved as the final disparity estimate.

At block 612, the processor performs final invalidation of clearly erroneous values and smoothing. Given the inherent physical limitations of an active stereo system (e.g., poor signal to noise ratio on dark or far surfaces, occlusions), not enough data is available to perform robust estimates for any given pixel. Traditional methods of invalidation involve left-right consistency checks, filtering, and/or connected component analysis—all computationally expensive methods. Instead, the method of 600 uses byproducts of the disparity estimation process to perform fast and precise invalidation. In particular, the processor does consider tiles that have slants greater than 75 degrees. Further, the processor invalidates pixels after refinement when the final matching cost is higher than a pre-defined threshold θ.

Accordingly, as described herein, high quality initial disparity estimates per pixel are quickly extracted via initialization, which aggregates results in a pyramidal fashion and only keeps good hypotheses. Reasoning about disparity at the pixel level allows quick discard of bad disparity hypotheses and shifts usage of compute resources towards better hypotheses, thus improving compute efficiency. The initial disparity estimates (i.e., disparity) candidates are refined through continuous refinement, which is then followed by an invalidation step.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
  capturing a first image and a second image of a scene using at least one imaging camera of an imaging system, wherein the first image and the second image form a stereo image pair and each comprises a plurality of pixels;
  initializing, at a processor of the imaging system, each of the plurality of pixels in the second image with a disparity hypothesis;
  recursively determining, at the processor, from an image tile of a smaller subset of pixels of the second image to an image tile of a larger subset of pixels of the second image, matching costs of the disparity hypothesis for each of the plurality of pixels in the second image to generate an initial tiled disparity map including a plurality of image tiles, wherein each image tile of the initial tiled disparity map is assigned a disparity value estimate;
  refining, at the processor, the disparity value estimate of each image tile and further associating the disparity value estimate of each image tile with a slant estimate;
  determining, at the processor, a final disparity estimate for each pixel of the second image based on the refined disparity value estimate of each image tile; and
  generating a depth map for the scene using correspondence between the plurality of pixels of the first image and the second image and based on the determined final disparity estimate for each pixel of the second image.

2. The method of claim 1, wherein initializing each of the plurality of pixels in the second image with a disparity hypothesis comprises:
seeding each of the plurality of pixels in the second image with a set of disparity hypotheses; and
comparing, for a first pixel of the plurality of pixels, matching costs between hypotheses in the set of disparity hypotheses relative to a disparity between a corresponding pixel in the stereo image pair; and
storing one of the set of disparity hypotheses with a lowest matching cost as the disparity hypothesis.

3. The method of claim 2, wherein recursively determining matching costs of the disparity hypothesis for each of the plurality of pixels in the second image further comprises:
computing, for the image tile of the smaller subset of pixels, matching costs associated with the disparity hypothesis for pixels associated with the image tile of the smaller subset of pixels; and
storing, for the image tile of the smaller subset of pixels, a hypothesis identified as having the lowest matching cost; and
providing the identified hypothesis to a next level of recursion.

4. The method of claim 3, further comprising:
computing, for the image tile of the larger subset of pixels, matching costs associated with the disparity hypothesis for pixels associated with the image tile of the larger subset of pixels, wherein the disparity hypothesis includes the identified hypothesis from the image tile of the smaller subset of pixels;
storing, for the image tile of the larger subset of pixels, the identified hypothesis having the lowest matching cost; and
providing the identified hypothesis to the next level of recursion.

5. The method of claim 1, wherein refining the disparity value estimate of each image tile further includes replacing the disparity value estimate and the slant estimate for at least one image tile with the disparity value estimate and the slant estimate of a neighboring image tile having a lower reconstruction cost.

6. The method of claim 1, wherein determining the final disparity estimate for each pixel of the second image further comprises:
expanding each image tile of the initial tiled disparity map to overlap a plurality of neighboring image tiles; and
generating, based on the expanded image tiles, a plurality of integral tiles.

7. The method of claim 6, further comprising:
performing, for each one pixel of the expanded image tiles, a plurality of parabola fits of cost volumes using the plurality of integral tiles;
computing a reconstruction error over patches centered over each one pixel of the expanded image tiles; and
saving a smallest reconstruction error as a final disparity estimate for each pixel of the initial tiled disparity map.

8. An electronic device, comprising:
a pair of cameras to capture a first image and a second image of a scene, wherein the first image and the second image form a stereo image pair and each comprises a plurality of pixels, and further wherein each of the plurality of pixels in the first image is associated with a disparity value; and a processor configured to:
initialize each of the plurality of pixels in the second image with a disparity hypothesis;
recursively determine, from an image tile of a smaller subset of pixels of the second image to an image tile of a larger subset of pixels of the second image, matching costs of the disparity hypothesis for each of the plurality of pixels in the second image to generate an initial tiled disparity map including a plurality of image tiles, wherein each image tile of the initial tiled disparity map is assigned a disparity value estimate;
refine the disparity value estimate of each image tile and associate the disparity value estimate of each image tile with a slant estimate;
determine, based on the refined disparity value estimate of each image tile, a final disparity estimate for each pixel of the second image; and
generate a depth map for the scene, using correspondence between the plurality of pixels of the first image and the second image and based on the determined final disparity estimate for each pixel of the second image.

9. The electronic device of claim 8, wherein the processor is further configured to:
seed each of the plurality of pixels in the second image with a set of disparity hypotheses;
compare, for a first pixel of the plurality of pixels, matching costs between hypotheses in the set of disparity hypotheses relative to a disparity between a corresponding pixel in the stereo image pair; and
store one of the set of disparity hypotheses with a lowest matching cost as the disparity hypothesis.

10. The electronic device of claim 9, wherein the processor is further configured to:
compute, for the image tile of the smaller subset of pixels, matching costs associated with the disparity hypothesis for pixels associated with the image tile of the smaller subset of pixels; and
store, for the image tile of a smaller subset of pixels, a hypothesis identified as having the lowest matching cost; and
provide the identified hypothesis to a next level of recursion.

11. The electronic device of claim 10, wherein the processor is further configured to:
compute, for the image tile of the larger subset of pixels, matching costs associated with the disparity hypothesis for pixels associated with the image tile of the larger subset of pixels, wherein the disparity hypothesis includes the identified hypothesis from the image tile of the smaller subset of pixels;
store, for the image tile of the larger subset of pixels, the identified hypothesis having the lowest matching cost; and
provide the identified hypothesis to the next level of recursion.

12. The electronic device of claim 8, wherein the processor is further configured to:
replace the disparity value estimate and the slant estimate for at least one image tile with the disparity value estimate and the slant estimate of a neighboring image tile having a lower reconstruction cost.

13. The electronic device of claim 8, wherein the processor is further configured to:
expand each image tile of the initial tiled disparity map to overlap a plurality of neighboring image tiles; and generate, based on the expanded image tiles, a plurality of integral tiles.

14. The electronic device of claim 13, wherein the processor is further configured to:
  perform, for each one pixel of the expanded image tiles, a plurality of parabola fits of cost volumes using the plurality of integral tiles;
  compute a reconstruction error over patches centered over each one pixel of the expanded image tiles; and
  save a smallest reconstruction error as a final disparity estimate for each pixel of the initial tiled disparity map.

15. A system, comprising:
  a pair of cameras to capture a first image and a second image of a scene, wherein the first image and the second image form a stereo image pair and each comprises a plurality of pixels, and further wherein each of the plurality of pixels in the first image is associated with a disparity value;
  an initialization module configured to initialize each of the plurality of pixels in the second image with a disparity hypothesis, wherein the initialization module is further configured to recursively determine, from an image tile of a smaller subset of pixels of the second image to an image tile of a larger subset of pixels of the second image, matching costs of the disparity hypothesis for each of the plurality of pixels in the second image to generate an initial tiled disparity map including a plurality of image tiles, wherein each image tile of the initial tiled disparity map is assigned a disparity value estimate;
  a propagation module configured to refine the disparity value estimate of each image tile and to associate the disparity value estimate of each image tile with a slant estimate; and
  a refinement module configured to determine, based on the refined disparity value estimate of each image tile, a final disparity estimate for each pixel of the second image.

16. The system of claim 15, wherein the initialization module is further configured to:
  seed each of the plurality of pixels in the second image with a set of disparity hypotheses;
  compare, for a first pixel of the plurality of pixels, matching costs between hypotheses in the set of disparity hypotheses relative to a disparity between a corresponding pixel in the stereo image pair; and
  store one of the set of disparity hypotheses with a lowest matching cost as the disparity hypothesis.

17. The system of claim 16, wherein the initialization module is further configured to:
  compute, for the image tile of the smaller subset of pixels, matching costs associated with the disparity hypothesis for pixels associated with the image tile of the smaller subset of pixels; and
  store, for the image tile of a smaller subset of pixels, a hypothesis identified as having the lowest matching cost; and
  provide the identified hypothesis to a next level of recursion.

18. The system of claim 17, wherein the initialization module is further configured to:
  compute, for the image tile of the larger subset of pixels, matching costs associated with the disparity hypothesis for pixels associated with the image tile of the larger subset of pixels, wherein the disparity hypothesis includes the identified hypothesis from the image tile of the smaller subset of pixels;
  store, for the image tile of the larger subset of pixels, the identified hypothesis having the lowest matching cost; and
  provide the identified hypothesis to the next level of recursion.

19. The system of claim 15, wherein the propagation module is further configured to:
  replace the disparity value estimate and the slant estimate for at least one image tile with the disparity value estimate and the slant estimate of a neighboring image tile having a lower reconstruction cost.

20. The system of claim 15, wherein the refinement module is further configured to:
  expand each image tile of the initial tiled disparity map to overlap a plurality of neighboring image tiles;
  generate, based on the expanded image tiles, a plurality of integral tiles;
  perform, for each one pixel of the expanded image tiles, a plurality of parabola fits of cost volumes using the plurality of integral tiles;
  compute a reconstruction error over patches centered over each one pixel of the expanded image tiles; and
  save a smallest reconstruction error as a final disparity estimate for each pixel of the initial tiled disparity map.

* * * * *